US012744775B2

(12) United States Patent
Holl et al.

(10) Patent No.: US 12,744,775 B2
(45) Date of Patent: Sep. 22, 2026

(54) ZERO-TOUCH ALWAYS-ON USER AUTHENTICATION FROM TRUSTED MULTIMEDIA SOURCES

(71) Applicant: Cisco Technology, Inc., San Jose, CA (US)

(72) Inventors: Steven Michael Holl, Sarasota, FL (US); Matthew Robert Engle, Plano, TX (US); Jason A. Kuhne, Hopkinton, MA (US); Jason Michael Coleman, Hendersonville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 175 days.

(21) Appl. No.: 18/590,562

(22) Filed: Feb. 28, 2024

(65) Prior Publication Data

US 2025/0274449 A1 Aug. 28, 2025

(51) Int. Cl.
*H04L 9/40* (2022.01)

(52) U.S. Cl.
CPC ........ *H04L 63/0861* (2013.01); *H04L 63/083* (2013.01)

(58) Field of Classification Search
CPC .......................... H04L 63/083; H04L 63/0861
See application file for complete search history.

(56) References Cited

U.S. PATENT DOCUMENTS 6,061,791 A 5/2000 Moreau
6,301,658 B1 10/2001 Koehler
6,766,160 B1 7/2004 Lemiläinen et al.
6,857,072 B1 2/2005 Schuster et al.
(Continued)

FOREIGN PATENT DOCUMENTS

CN 105074716 A 11/2015
GB 2457491 A 8/2009
(Continued)

OTHER PUBLICATIONS

Baygin, S., et al., "Authenticated Access into Secure Meetings for Video Conferencing Systems," Technical Disclosure Commons, Defensive Publications Series, www.tdcommons.org/dpubs_series/3477/, Jul. 31, 2020, 7 pages.
(Continued)

*Primary Examiner* — Chau Le
(74) *Attorney, Agent, or Firm* — Edell, Shapiro & Finnan, LLC

(57) ABSTRACT

A method comprises: at an identity provider, upon receiving a request for authentication of a user to a target application that is hosted on a user device and into which the user has logged-in: identifying one or more biometric tests to be applied to the user to satisfy the request; selecting, from a list of application services that have trust relationships with the identity provider, an application service which has an active session with the user and supports the one or more biometric tests; requesting the application service to perform multi-factor authentication that includes the one or more biometric tests; receiving, from the application service, biometric test results that indicate whether each of the one or more biometric tests passed or failed; and determining that the authentication has passed or failed based on the biometric test results.

20 Claims, 6 Drawing Sheets

(56) References Cited

U.S. PATENT DOCUMENTS

| | | | | |
|---|---|---|---|---|
| 7,242,923 | B2 | 7/2007 | Perera et al. | |
| 7,443,817 | B2 | 10/2008 | Farnham | |
| 7,590,418 | B1 | 9/2009 | Thomson | |
| 7,673,004 | B1 | 3/2010 | Sherstinsky et al. | |
| 7,814,311 | B2 | 10/2010 | Convery et al. | |
| 8,887,243 | B2 | 11/2014 | Thomson et al. | |
| 9,038,157 | B1 | 5/2015 | Santiago, Jr. et al. | |
| 9,363,108 | B2 | 6/2016 | Bell et al. | |
| 9,432,339 | B1 | 8/2016 | Bowness | |
| 9,467,811 | B2 | 10/2016 | Nilsson | |
| 9,717,106 | B2 | 7/2017 | Bell et al. | |
| 9,871,791 | B2 | 1/2018 | Blinn | |
| 9,967,750 | B1 | 5/2018 | Fernandez et al. | |
| 10,382,413 | B1 | 8/2019 | Friel et al. | |
| 11,265,302 | B2 | 3/2022 | Friel et al. | |
| 11,449,589 | B2 * | 9/2022 | Gehrmann | H04L 9/0894 |
| 11,750,583 | B2 | 9/2023 | Friel et al. | |
| 12,010,513 | B2 * | 6/2024 | Hanley | G06Q 20/405 |
| 2002/0044658 | A1 | 4/2002 | Wasilewski et al. | |
| 2002/0126701 | A1 | 9/2002 | Requena | |
| 2002/0141586 | A1 | 10/2002 | Margalit et al. | |
| 2003/0014372 | A1 | 1/2003 | Wheeler et al. | |
| 2004/0002902 | A1 | 1/2004 | Muehlhaeuser | |
| 2005/0010780 | A1 | 1/2005 | Kane et al. | |
| 2005/0086300 | A1 | 4/2005 | Yeager et al. | |
| 2005/0239453 | A1 | 10/2005 | Vikberg et al. | |
| 2005/0286466 | A1 | 12/2005 | Tagg et al. | |
| 2006/0007920 | A1 | 1/2006 | Michel et al. | |
| 2006/0083187 | A1 | 4/2006 | Dekel | |
| 2006/0110011 | A1 * | 5/2006 | Cohen | G06V 10/95 382/115 |
| 2006/0233166 | A1 | 10/2006 | Bou-Diab et al. | |
| 2006/0293028 | A1 | 12/2006 | Gadamsetty et al. | |
| 2007/0016444 | A1 | 1/2007 | Holkkola | |
| 2007/0030824 | A1 | 2/2007 | Ribaudo et al. | |
| 2007/0178882 | A1 | 8/2007 | Teunissen et al. | |
| 2007/0274270 | A1 | 11/2007 | Jones et al. | |
| 2007/0277230 | A1 | 11/2007 | Hawkins et al. | |
| 2008/0140868 | A1 | 6/2008 | Kalayjian et al. | |
| 2008/0159266 | A1 | 7/2008 | Chen et al. | |
| 2008/0226070 | A1 | 9/2008 | Herz | |
| 2009/0081999 | A1 | 3/2009 | Khasawneh et al. | |
| 2009/0119762 | A1 | 5/2009 | Thomson et al. | |
| 2009/0170519 | A1 | 7/2009 | Wilhoite et al. | |
| 2009/0198997 | A1 | 8/2009 | Yeap et al. | |
| 2009/0201917 | A1 | 8/2009 | Maes et al. | |
| 2009/0247194 | A1 | 10/2009 | Tarrago et al. | |
| 2009/0325491 | A1 | 12/2009 | Bell et al. | |
| 2010/0241748 | A1 | 9/2010 | Ansari et al. | |
| 2011/0113245 | A1 | 5/2011 | Varadarajan | |
| 2012/0212323 | A1 | 8/2012 | Skaaksrud et al. | |
| 2013/0117801 | A1 | 5/2013 | Shieh et al. | |
| 2013/0254858 | A1 | 9/2013 | Giardina et al. | |
| 2013/0262863 | A1 | 10/2013 | Yoshino et al. | |
| 2013/0326614 | A1 | 12/2013 | Truskovsky et al. | |
| 2013/0339722 | A1 | 12/2013 | Krendelev et al. | |
| 2014/0201517 | A1 | 7/2014 | Corrion | |
| 2014/0359722 | A1 * | 12/2014 | Schultz | H04L 63/0861 726/5 |
| 2014/0380425 | A1 | 12/2014 | Lockett et al. | |
| 2015/0007279 | A1 | 1/2015 | Hattori | |
| 2015/0256338 | A1 | 9/2015 | Roberts | |
| 2015/0281184 | A1 | 10/2015 | Cooley | |
| 2015/0281185 | A1 | 10/2015 | Cooley | |
| 2016/0036808 | A1 | 2/2016 | Li | |
| 2016/0337131 | A1 * | 11/2016 | de Andrada | H04L 9/14 |
| 2016/0364559 | A1 * | 12/2016 | Bali | G06F 21/62 |
| 2017/0126404 | A1 | 5/2017 | Unagami et al. | |
| 2017/0126661 | A1 | 5/2017 | Brannon | |
| 2017/0127276 | A1 | 5/2017 | Koo et al. | |
| 2017/0266562 | A1 | 9/2017 | Hong | |
| 2017/0279733 | A1 | 9/2017 | Marshall et al. | |
| 2018/0096118 | A1 * | 4/2018 | Perotti | G06F 21/32 |
| 2019/0058989 | A1 | 2/2019 | Park et al. | |
| 2019/0089702 | A1 * | 3/2019 | Bhatt | G06Q 50/265 |
| 2020/0007333 | A1 * | 1/2020 | Young | H04L 9/50 |
| 2020/0250664 | A1 | 8/2020 | Kumar et al. | |
| 2020/0322330 | A1 * | 10/2020 | Lynn | H04L 63/20 |
| 2021/0037009 | A1 * | 2/2021 | Yang | H04L 63/0861 |
| 2022/0255923 | A1 | 8/2022 | Szigeti et al. | |
| 2022/0321556 | A1 * | 10/2022 | Gandhi | H04W 12/068 |
| 2023/0014970 | A1 | 1/2023 | Gujarathi et al. | |
| 2023/0065478 | A1 * | 3/2023 | Lee | G06F 21/32 |

FOREIGN PATENT DOCUMENTS

| | | | |
|---|---|---|---|
| WO | 2012142354 | A1 | 10/2012 |
| WO | 2013128470 | A1 | 9/2013 |
| WO | 2023147459 | A2 | 8/2023 |

OTHER PUBLICATIONS

Bluetooth, "Simple Pairing Whitepaper," Special Interest Group, Released Version, https://docplayer.net/21765191-Simple-pairing-whitepaper.html, Aug. 3, 2006, 23 pages.

Bluetooth, "Specification of the Bluetooth System, Wireless Connections Made Easy," Master Table of Contents & Compliance Requirements, Bluetooth Specification version 2.1+EDR, Jul. 26, 2007, 1415 pages.

Mcgrew D., et al., "Encrypted Key Transport for Secure RTP," AVT Working Group, https://datatracker.ietf.org/doc/draft-ietf-avtcore-srtp-ekt/00/, Jul. 9, 2012, 51 pages.

Microsoft, "End to End Trust Progress," https://web.archive.org/web/20140223011230/https://www.microsoft.com/mscorp/twc/endtoendtrust/vision/reputation.aspx, retrieved Mar. 13, 2014, 2 pages.

MIT Kerberos Consortium, "The Role of Kerberos in Modern Information Systems," https://www.kerberos.org/software/rolekerberos.pdf, retrieved Feb. 13, 2024, 53 pages.

Perspecsys, "Cloud Data Encryption Primer," Cloud Data Encryption & SaaS Protection, retrieved on Jan. 24, 2014, 6 pages.

* cited by examiner

ZERO-TOUCH ALWAYS-ON USER AUTHENTICATION FROM TRUSTED MULTIMEDIA SOURCES

TECHNICAL FIELD

The present disclosure relates to zero-touch user authentication using trusted multimedia sources.

BACKGROUND

Due to zero-trust authentication strategies, users of computer applications are prompted throughout their day with authentication prompts to access computer applications. Even with single sign on (SSO) to unify authentication control, and caching of authentication tokens on the client-side for a duration of time until expiry, authentication with multifactor authentication (MFA) has become burdensome to the user community. This results in context-switching away from the business tasks that the users intend to perform. Such context-switching is especially cumbersome when switching across devices (e.g., using an additional login from a mobile phone or iPad, or for embedded logins such as within a collaboration chat application for a productivity suite integration), which presents an increased challenge in a hybrid world where users are on the move across devices throughout their workday.

DETAILED DESCRIPTION

Overview

In an embodiment, a method comprises: at an identity provider, upon receiving a request for authentication of a user to a target application that is hosted on a user device and into which the user has logged-in: identifying one or more biometric tests to be applied to the user to satisfy the request; selecting, from a list of application services that have trust relationships with the identity provider, an application service which has an active session with the user and supports the one or more biometric tests; requesting the application service to perform multifactor authentication that includes the one or more biometric tests; receiving, from the application service, biometric test results that indicate whether each of the one or more biometric tests passed or failed; and determining that the authentication has passed or failed based on the biometric test results.

EXAMPLE EMBODIMENTS

Compared to conventional authentication techniques, embodiments presented herein provide a user with a less disruptive way to authenticate into a user application and protected business websites, while maintaining the additional security that is gained from multifactor authentication (MFA). The embodiments reduce the amount of re-authentication prompts to the user throughout his/her business day, reduce human context-switching away from business value-adding tasks, and minimize user fatigue. These and other features and advantages will be evident from the ensuing description of the embodiments.

Figure 1:
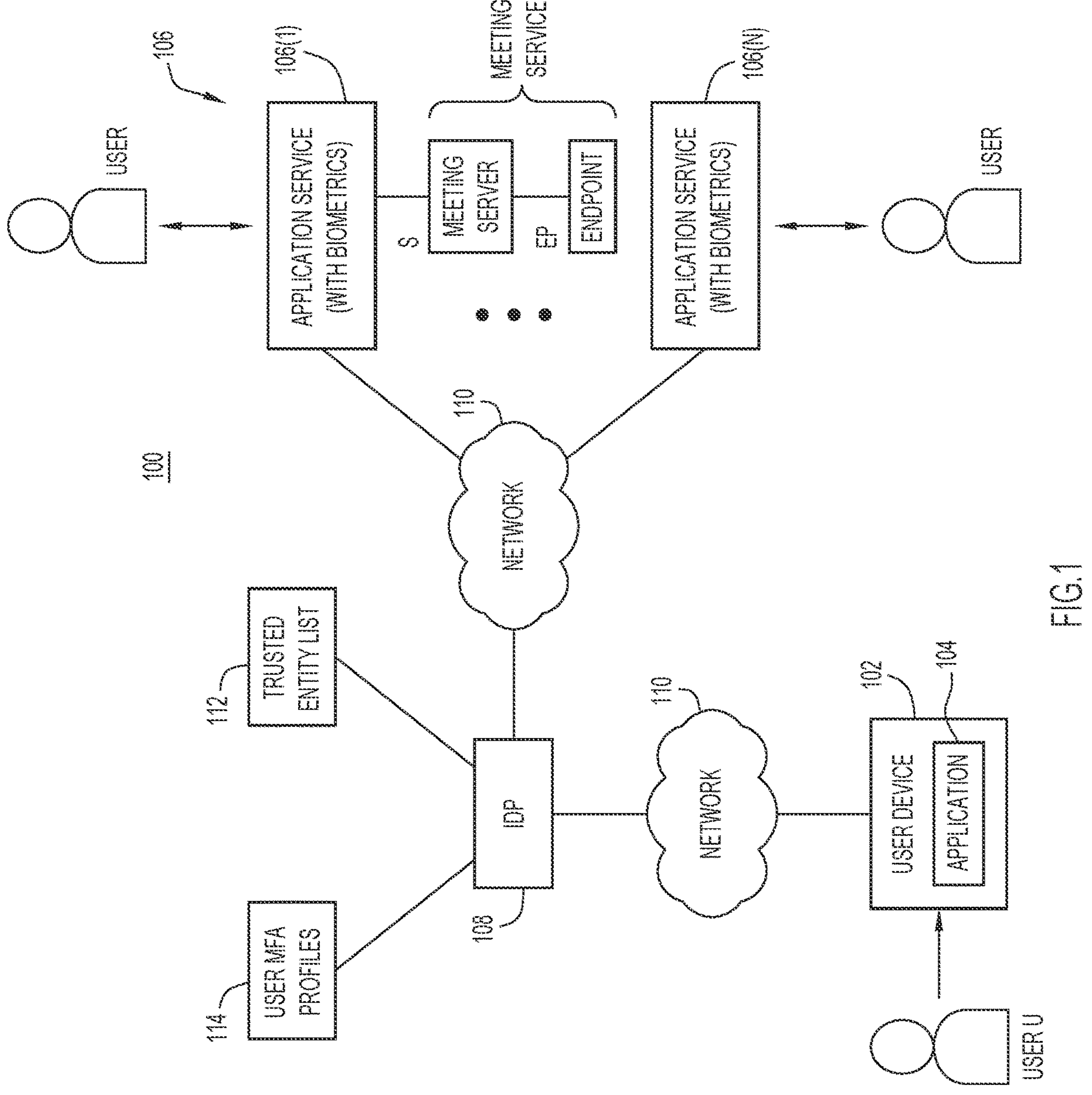
FIG. 1 is a diagram of a computer environment in which zero-touch always-on multifactor authentication (MFA) of a user using trusted multimedia sources may be implemented, according to an example embodiment.

FIG. 1 is a diagram of an example computer environment 100 in which zero-touch always-on MFA of a user using trusted multimedia sources may be implemented. Computer environment 100 includes a user device 102 operated by a user U and configured to host a user application 104 for the user, application services 106(1)-106(N) (collectively referred to as "application services 106") associated with users (which may or may not be user U), and an identity provider (IDP) 108 (also referred to as an "IDP entity" or an "IDP controller"). User device 102, application services 106, and IDP 108 are connected to a network 110 and configured to communicate with each other over the network. Network 110 may include one or more wide area networks (WANs), such as the Internet, and one or more local area networks (LANs). User device 102, application services 106, and IDP 108 may exchange data packets with each other over network 110 using any known or hereafter developed network protocols, including, but not limited to, the Transmission Control Protocol (TCP)/Internet Protocol (IP) (TCP/IP), for example.

By way of example, user device 102 may include a portable computer, a smartphone, a computer tablet, a laptop computer, and the like. In the example of FIG. 1, user device 102 hosts user application 104; however, the user application 104 may be hosted remotely from the user device. Whether hosted on user device 102 or remotely, user U may access user application 104 through a user interface of the computer device. Non-limiting examples of user application 104 may include any personal or business application, such as an accounting program, database programs, productivity suites (e.g., Word®), and the like. User application 104 may also include any application and content accessed through browser/web pages, and the like. While only a single user device (and its associated user) is shown in the example of FIG. 1, computer environment 100 may include many such user devices operated by local users.

Application services 106 provide a variety of interactive multimedia sources and services. Examples of interactive multimedia services include meeting/collaboration services, such as video conferencing, chat, and other multimedia services. For example, application service 106(1) (e.g., a meeting service) may include a meeting server S (also referred to as a "collaboration/meeting server") that controls an endpoint EP (also referred to as a "user endpoint device") to provide video conferencing, chat, and other multimedia services to a user interacting with the endpoint. Application services 106 include/provide biometric sensors to capture biometric readings from users when the users interact with the application services during collaboration sessions. For example, endpoint EP of application service 106(1) may include, or have access to, one or more of a video camera to capture video of a face of a user, a microphone to capture audio (e.g., voice) from the user, a retina scanner to scan/read a retina of the user, and a fingerprint scanner to read a fingerprint of the user. Such biometric sensors may be integrated with endpoint EP, or may be connected to the endpoint through wireless or wired connections.

IDP 108 may be implemented as one or more IDP applications hosted on an IDP server, for example. IDP 108 establishes, and then maintains, trust relationships with user device 102, user application 104, and application services 106 (collectively referred to as "trusted entities" once such trust relationships have been established). IDP 108 stores in memory a trusted entity list 112 that lists/identifies the trusted user device(s) and application services 106. Trusted entity list 112 also lists types of biometric sensors provided by corresponding ones of application services 106. That is, trusted entity list 112 may include a mapping of an application service 106 (*i*) that is trusted to a list of biometric sensors accessible to that application service. IDP 108 also stores, in memory, user MFA profiles 114 for corresponding users. A user authentication profile includes predetermined MFA criteria for a user. The MFA criteria may include, for example, types of biometric tests that should be performed to authenticate the user, and the minimum level of confidence associated with the biometric tests required for successful authentication. The user authentication profile is mapped to an identity of the user (i.e., a user identity, such as a user name or other unique user identifier).

IDP 108 relies on trusted entity list 112, user MFA profiles 114, and biometric tests supported by application services 106 to manage/perform zero-touch MFA of user U to user application 104, after the user application has accepted an initial single sign on (SSO) action from the user. The MFA includes biometric authentication of user U. Zero-touch MFA of the user refers to performing MFA of the user in a way that is transparent to the user, without prompting the user to perform actions specific to the MFA. At a high level, the initial SSO triggers user device 102 (or user application 104) to send to IDP 108 a request to authenticate user U to the user application. Responsive to the request, IDP 108 executes the zero-touch MFA using trusted entity list 112, a user authentication profile for the user from user MFA profiles 114, and one of application services 106 (e.g., application server 106(1)) with which the user is currently engaged in a session. In an example in which user U interacts with user device 102 and application service 106(1) more or less concurrently, IDP 108 relies on the application service to assist with zero-touch biometric authentication (i.e., testing) of the user, as described below in connection with FIG. 2. In this sense, application service 106(1) serves user U as a "multimedia MFA service."

Figure 2:
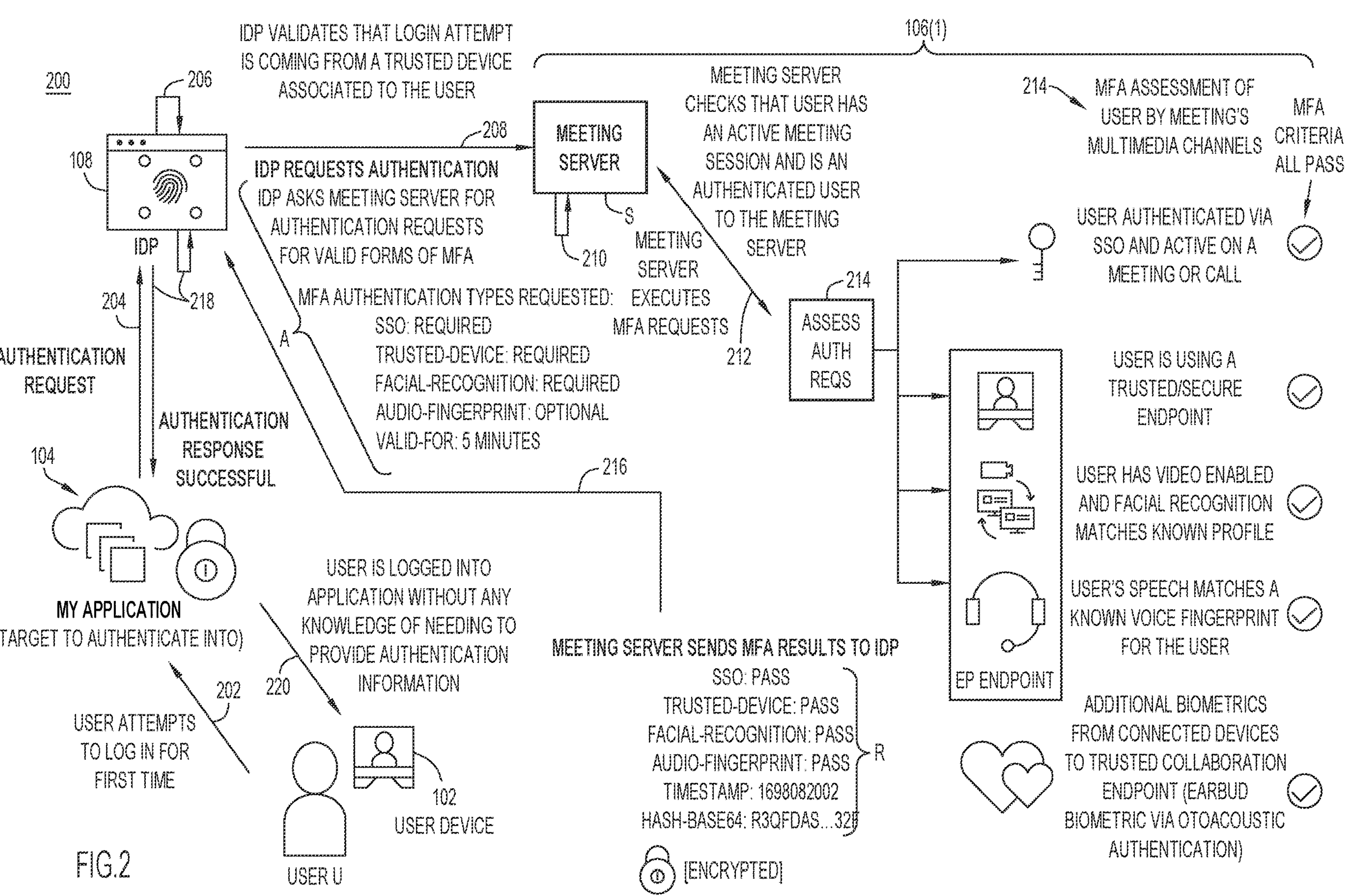
FIG. 2 shows a method of zero-touch MFA of a user into a user application performed in the computer environment, according to an example embodiment.

FIG. 2 shows an example method 200 of zero-touch MFA of user U into user application 104 performed in computer environment 100. The zero-touch MFA involves zero-touch biometric testing on user U.

At 202, user U performs an SSO into user application 104 (denoted "my application" in FIG. 2) through user device 102. User application 104 is the target of authentication. Responsive to the SSO, at 204, user device 102 sends to IDP 108 a request (also referred to as a "user authentication request" or simply "authentication request") to authenticate user U into user application 104. The request includes a user identity of user U (i.e., a user identifier, e.g., a user name), an identity of user application 104 (i.e., an application identifier, e.g., an application name), and an identity of user device 102 (e.g., a device identifier).

Upon receipt of the request, at 206, IDP 108 records a request timestamp at which the request was received, and verifies that user device 102 (through which the login attempt (e.g., the SSO) was made) is trusted. To verify the trust, IDP 108 searches trusted entity list 112 for a user device identifier and/or user application identifier that matches the user device identifier for user device 102 and/or a user application identifier for user application 104 that is/are included with the request. Assuming that user device 102/user application 104 is/are trusted, IDP 108 determines which types of biometric authentication (i.e., which types of biometric testing) should be performed on user U to satisfy the request. To do this, using the identity of user U acquired from the request, IDP 108 searches user MFA profiles 114 for a user MFA profile that matches user U. When found, the user MFA profile for user U lists MFA criteria to be satisfied to authenticate user U. The MFA criteria includes an indication of whether SSO into an application service is required, a list of one or more biometric tests to be performed on user U, and a confidence threshold to be met by passing test results reported by the biometric tests. The MFA criteria may further include a predetermined time period (also referred to as a "proximity time period") over which biometric test results remain valid from the time when user U performed the SSO into user application 104. Example biometric tests include, but are not limited to, facial recognition, audio or voice recognition, fingerprint recognition, retina recognition, and the like.

Armed with the MFA criteria for user U, IDP 108 determines/identifies an application service among application services 106 that is (i) trusted, and (ii) capable of performing the biometric tests listed in the MFA criteria for user U. To do this, IDP 108 searches trusted entity list 112 for one (or possibly more) of application services 106 that is configured with biometric sensors that match the biometric tests listed in the MFA criteria for user U. For example, when the MFA criteria for user U include one or more of facial recognition, voice recognition, fingerprint recognition, and retina recognition, IDP 108 searches for an application service equipped with one or more of a video camera, a microphone, a fingerprint reader, and a retina scanner, respectively. In the example of FIG. 2, IDP 108 identifies application service 106(1) with meeting server S and endpoint EP to satisfy the MFA criteria. In an example, application service 106(1) may support/manage Webex meetings, Webex Teams, Zoom meetings, and so on.

Upon performing the above-mentioned verifications and identifying application service 106(1), at 208, IDP 108 creates an IDP request for authentication (i.e., an IDP authentication request) that lists the MFA criteria for user U, and sends the same to meeting server S of the application service. Ideally, the time at which IDP 108 sends the IDP authentication request to meeting server S is contemporaneous with when user U performed the SSO into user application 104. In the example of FIG. 2, the IDP authentication request includes MFA criteria A that specify that an SSO into application service 106(1) by user U is required, the application service should be trusted, facial recognition is required, voice recognition is optional, and the predetermined time period is 5 minutes.

Upon receiving the IDP authentication request, at 210, meeting server S determines/verifies that user U is an active user in a multimedia session associated with the application service and identifies endpoint EP with which the user is interacting in the multimedia session. For example, user U may be logged into an online meeting session or logged into a chat/messaging session via endpoint EP. Meeting server S also verifies that user U is authenticated to the meeting server S via SSO. Assuming the aforementioned verifications hold true, meeting server S verifies that resources under control of the meeting server, e.g., endpoint EP, have their biometric sensors enabled and are therefore equipped to perform the biometric tests prescribed by the IDP authentication request. For example, meeting server S verifies that one or more of the following biometric capabilities are enabled: a video camera for capturing video of the user; a microphone for capturing voice/audio of the user; a fingerprint reader to read a fingerprint of the user; and a retina scanner to scan a retina of the user.

At 212, meeting server S dispatches to the resources identified above (e.g., to endpoint EP) meeting-server-originated MFA requests to perform the biometric tests. This can be thought of as dispatching to various multimedia channels of application service 106(1) (e.g., to a video channel, an audio channel, and so on) various MFA requests to perform corresponding ones of the biometric tests (e.g., facial recognition, voice recognition, and so on).

Responsive to the meeting-server-originated MFA requests, at 214, the resources (e.g., endpoint EP) assess the meeting-server-originated MFA requests and perform, or assist meeting server S with performing, the biometric tests. The aforementioned assessment may employ machine learning (ML) techniques, and the like. Generally, each biometric test includes capturing biometric information of a user using a biometric sensor, comparing the biometric information to a predetermined/expected biometric print for the user and, based on comparing, returning a biometric test result that the biometric test either passed or failed. When the captured biometric information matches the predetermined biometric print within a tolerance, the biometric test result indicates that the biometric test passed (i.e., a "passing" test result). The biometric test result may also include a timestamp that indicates when the biometric test was performed. A passing test result may further include a confidence level that the passing test result is true. The confidence level represents a probability score that the biometric test result returned a true positive (i.e., pass). On the other hand, when the captured biometric information does not match the predetermined biometric print within the tolerance, the biometric test result indicates that the biometric test failed (i.e., a "failing" test result). Specific types of biometric tests (also referred to as "biometric recognition") are described below.

Facial recognition includes capturing video of a face of the user, comparing the video or photographic snapshot of the face to a predetermined faceprint for the user, and returning a timestamped test result that indicates that the facial recognition passed (i.e., the face matches the faceprint and is therefore recognized) or failed (i.e., the face does not match the faceprint and is therefore not recognized). The passing test result may include a confidence level that the passing test result is true.

Voice recognition includes capturing a voice of the user, comparing the voice to a predetermined voiceprint for the user, and returning a timestamped test result that indicates that the voice recognition passed (i.e., the voice matches the voiceprint) or failed (i.e., the voice does not match the voiceprint). The passing test result may include a confidence level that the pass is true.

Fingerprint recognition includes reading a fingerprint of the user, comparing the fingerprint reading to a known fingerprint for the user, and returning a timestamped test result that indicates that the fingerprint recognition passed (i.e., the fingerprint reading matches the known fingerprint) or failed (i.e., the fingerprint reading does not match the known fingerprint). The passing test result may include a confidence level that the pass is true.

Retina recognition includes scanning a retina of the user, comparing the retina scan to a predetermined retina print for the user, and returning a timestamped test result that indicates that the retina recognition passed (i.e., the retina scan matches the retina print) or failed (i.e., the retina scan does not match the retina print). The passing test result may include a confidence level that the pass is true.

As mentioned above, the application service resources (e.g., endpoint EP and its associated biometric sensors) used to perform the biometric tests return to meeting server S biometric test results for the biometric tests that mirror those requested by the server. The biometric test results list pass/fail results/status for the biometric tests, may include confidence levels for passing indications, and may include timestamps. In an example, a timestamp included with a biometric test result for facial recognition may be used to ensure that the user is actively near a camera used for the facial recognition, to prevent a situation where the user has walked away from the camera, and also to prevent an attacker from capturing a prior authentication message and replaying it at a later time for malicious authentication.

Upon receiving the biometric test results, meeting server S compiles the same into a results report. Meeting server S appends to the results report a report timestamp and digitally signs the results report (i.e., appends a digital signature), which prevents tampering or modification of the results report. At 216, IDP 108 sends the results report to IDP 108. In the example of FIG. 2, a results report R includes the following status: SSO: pass; trusted device: pass; facial recognition: pass; voice recognition: pass; timestamp 1698082002; and a hash result.

Upon receiving the results report from meeting server S, at 218, IDP 108 examines/parses the biometric test results in the results report. IDP 108 determines whether the report timestamp and the request timestamp from 206 both fall within the predetermined time period to ensure that the request received at 204 and the biometric tests received by IDP 108 at 216 are more or less contemporaneous (which indicates that user U is accessing user application 104 and endpoint EP more or less at the same time). When the two timestamps fall within the predetermined time period, IDP 108 proceeds with authentication based on the biometric test results, otherwise the IDP does not perform authentication based on the biometric test results.

Assuming that the two timestamps both fall within the predetermined time period, IDP 108 determines whether the user passed or failed authentication based on the biometric test results. Generally, IDP 108 determines that authentication has passed (i.e., is successful) when the biometric test results indicate that the biometric tests have passed and, in some examples, when the associated confidence levels exceed the confidence threshold. For example, IDP 108 may use a confidence level to only offer successful user authentication when the confidence level of a true positive (i.e., a pass) is above a discrete value of probability (e.g. the confidence threshold). For example, IDP 108 may only authenticate the user when facial recognition is at least a 99.9% confident match. When authentication has passed, IDP 108 considers user U authenticated and bypasses presenting any additional authentication methods to the user. Upon successful authentication, at 220, IDP 108 sends to user application 104/user device 102 an authenticated session token. Overall, the process offers a zero-touch seamless, non-intrusive authentication for the user into his/her target application.

On the other hand, IDP 108 determines that the authentication has failed (i.e., is unsuccessful) when the biometric test results indicate that one or more of the biometric tests have failed and, in some examples, when the associated confidence levels do not exceed the confidence threshold. When the authentication fails, or does not meet the level of multifactor required (e.g., the report indicates the wrong biometric types from what was requested), then IDP 108 simply falls back to prompting the user (through user device 102) for a username/password and for MFA using the normal means as if there were no zero-touch MFA authentication.

Figure 3:
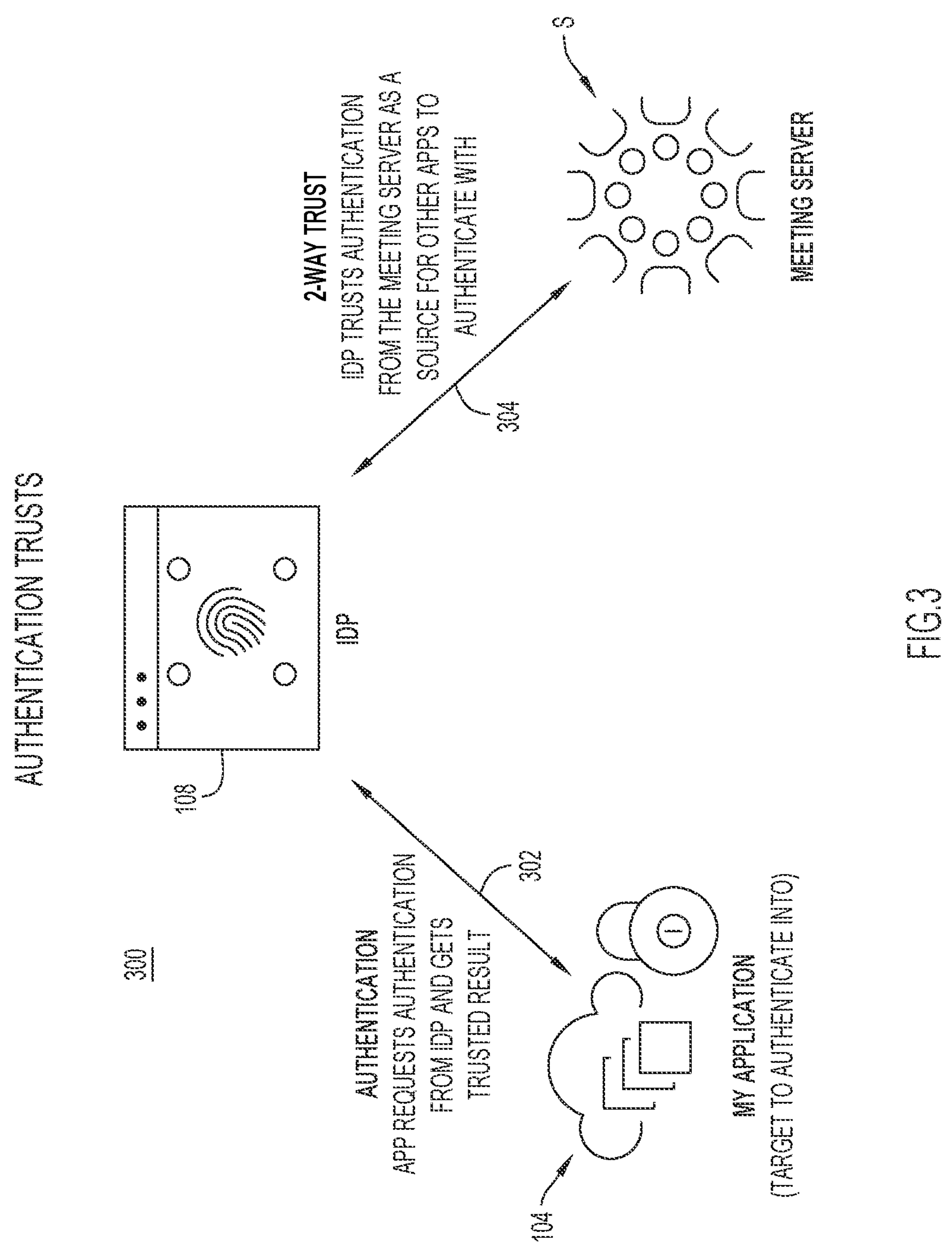
FIG. 3 is an illustration of a method by which an identity provider (IDP) establishes trust relationships with a user application and a meeting/collaboration server, according to an example embodiment.

The techniques described above rely on pre-established (i.e., a priori) trust relationships across the entities shown in FIG. 1. For example, prior to executing the zero-touch MFA described in connection with FIG. 2, IDP 108 establishes trust relationships with the user applications (e.g., user application 104) and with the user devices (e.g., user device 102). Similarly, IDP 108 establishes trust relationships with application services 106 (e.g., with meeting server S and with endpoint(s) EP). FIG. 3 is an illustration of an example method 300 by which IDP 108 establishes trust relationships with user application 104 and meeting server S.

At 302, IDP 108 and user application 104 exchange messages to establish mutual trust. For example, user application 104 sends an authentication request to IDP 108 (which is not to be confused with the initial request for authentication that is sent by user application 104 to the IDP at 204, as described above in connection with FIG. 2). Upon receiving the authentication request, IDP 108 generates a trust result and sends the same to user application 104. In an example, the two entities share their public key infrastructure (PKI) certificates with each other, and thereby establish an encrypted transport layer security (TLS) and trusted relationship between themselves. IDP 108 adds user application 104 to trusted entity list 112 for access during a subsequent authentication, as described above.

At 304, IDP 108 and meeting server S exchange messages to establish trust between the IDP and the meeting server. For example, meeting server S sends an authentication request to IDP 108. Upon receiving the authentication request, IDP 108 generates a trust result and sends the same to meeting server S. In an example, the two entities share their PKI certificates with each other, and thereby establish an encrypted TLS and trusted relationship between themselves. IDP 108 adds meeting server S to trusted entity list 112 for access during a subsequent authentication, as described above.

In addition, user devices (e.g., user device 102) and the endpoint devices (e.g., endpoint EP) establish trust relationships with IDP 108. To do this, the devices enroll in IDP 108 as trusted devices. This may include pushing to the devices device management profiles (such as mobile device management (MDM) for iOS) to ensure that the devices are "hardened" and have password/passcode time-based locks before establishing the trust. There may be an ability to revoke trust from IDP 108 or an MDM console, in the event a known device is stolen. One technique may establish trust across a physical connection, such as universal serial bus (USB) or High-Definition Multimedia Interface (HDMI) connectivity, between an endpoint and a user device (e.g., a personal computer). Another technique may allow a user to trust a user device, upon first login to the user device to enroll it into a trusted device group. For example, the user may be presented with a prompt: "a new login has been detected from device JSMITH-LAPTOP on Jan. 2, 2023, at 15:00:23 from Raleigh, North Carolina. Would you like to enroll and trust this device for future MFA logins?"

Figure 4:
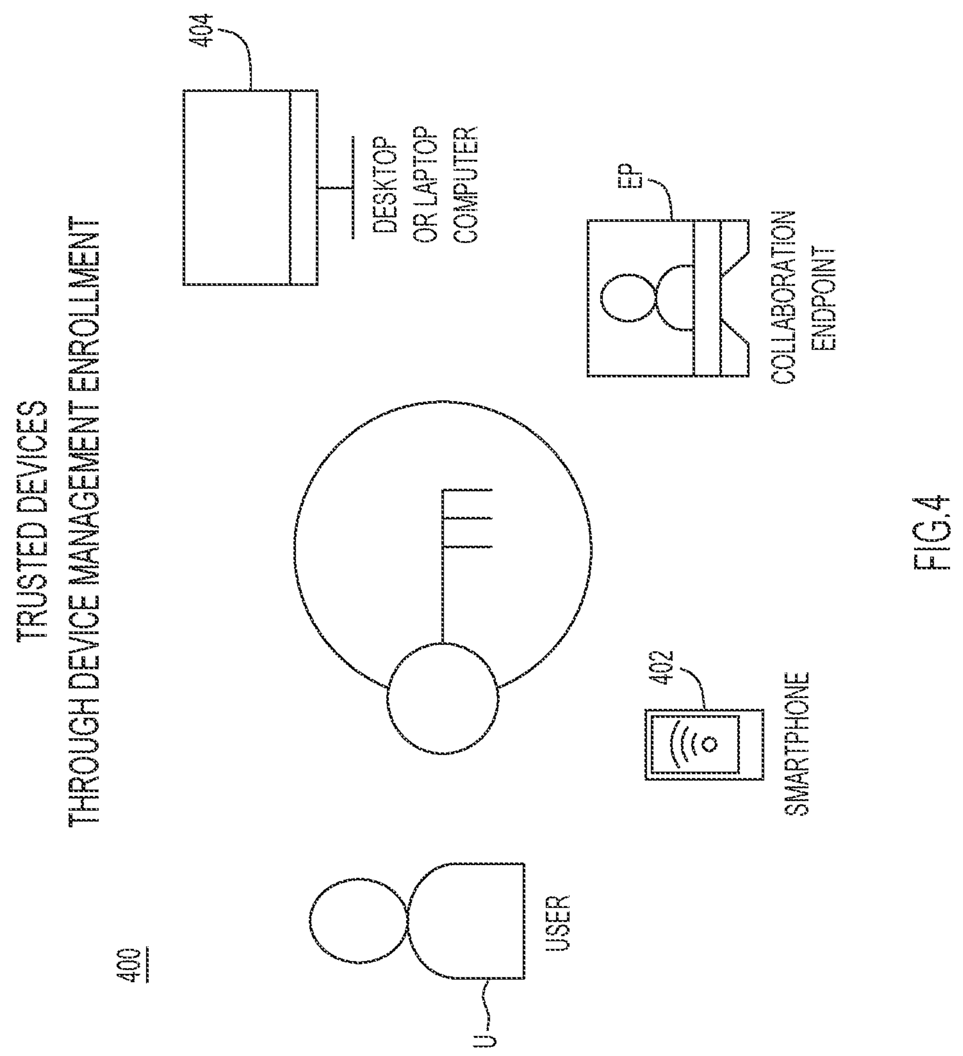
FIG. 4 is an illustration of devices associated with a user that have established a priori trust relationships with the IDP, according to an example embodiment.

FIG. 4 is an illustration of example devices 400 associated with user U that have established a priori trust relationships with IDP 108 according to the above-described techniques, e.g., using device management enrollment through IDP 108 and/or direct connection from the IDP to the devices. Devices 400 include a smartphone 402 and a desktop or laptop computer 404, which are both examples of user device 102. Devices 400 further include endpoint EP. Identities of all of the devices are entered into trusted entity list 112.

Figure 5:
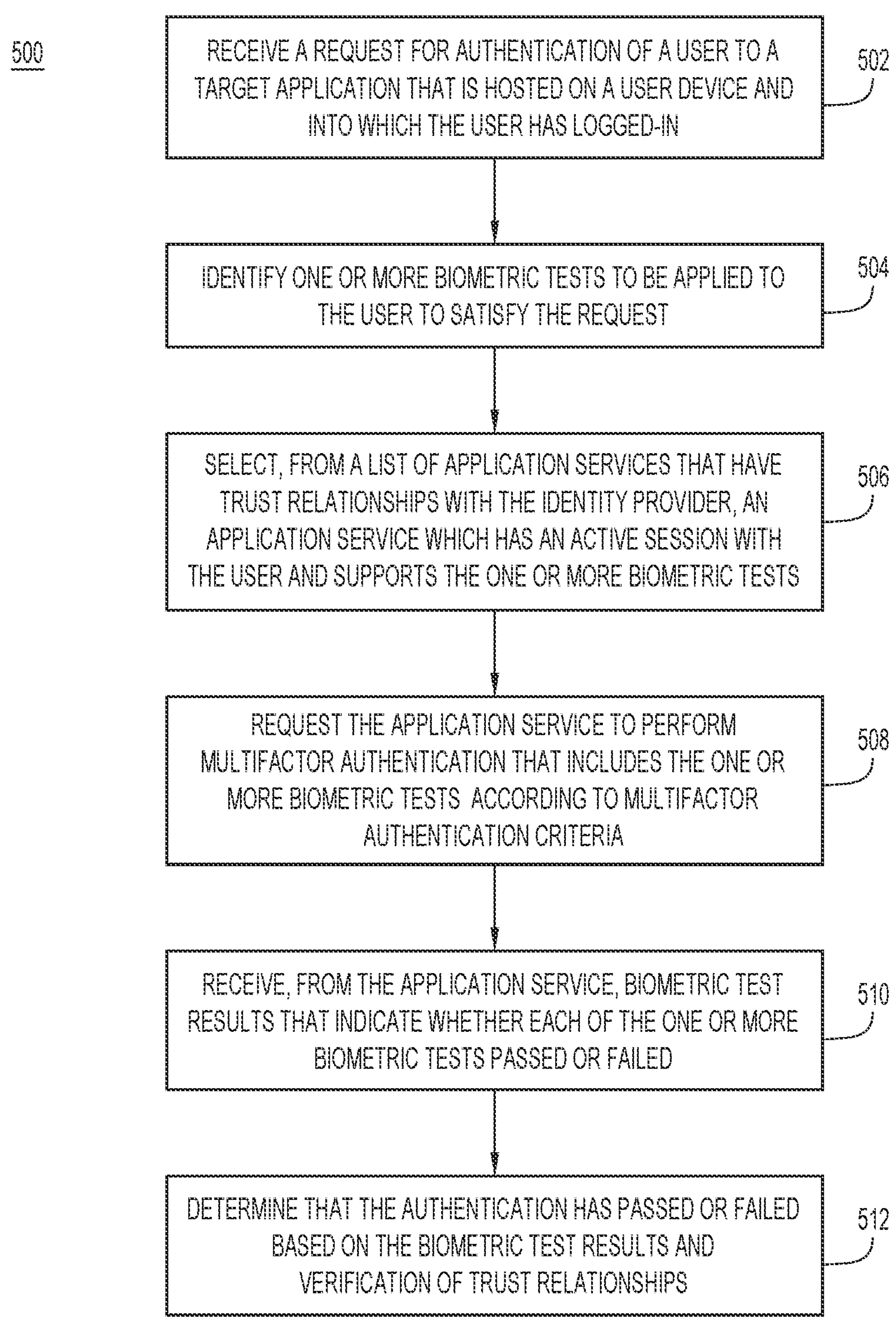
FIG. 5 is a flowchart of a method of zero-touch MFA of a user into a target application performed primarily at the IDP, according to an example embodiment.

FIG. 5 is a flowchart of an example method 500 of zero-touch MFA of a user into an initially unauthenticated target application performed primarily at an IDP (e.g., IDP 108). Operations of method 500 are described above. Method 500 assumes execution of a prior operations in which the IDP has established trust relationships with various user devices, target applications, and application services by exchanging PKI certificates with the aforementioned non-IDP entities, and recording them in a trusted entities list. That is, the a priori operations include establishing trust relationships with the user devices/target applications and application services.

At 502, the IDP receives a request for authentication of the user to the (unauthenticated) target application. The target application is hosted on a user device and the user has logged into the target application using SSO. Upon receiving the request, the IDP records a request timestamp (e.g., a first timestamp), and executes an authentication process including next operations 504-512. The IDP verifies that the user device and/or the target application have trusted relationships with the IDP.

At 504, the IDP identifies one or more biometric tests to be applied to the user to satisfy the request. For example, the IDP searches MFA user profiles that include mappings of biometric tests to user identities based on a user identity received with the request. A found MFA user profile for the user may list biometric tests that include one or more of facial recognition, voice recognition, finger print recognition, retina recognition, and so on.

At 506, the IDP selects, from a list of application services that have trust relationships with the identity provider (e.g., that are listed in a trusted entity list), an application service which has an active session with the user (at the same time at which the user is interacting with the user device) and supports the one or more biometric tests. The application service may be a meeting/conference service that includes a meeting server and an endpoint that includes biometric sensors that support the biometric tests. For example, the user may have performed the SSO into the unauthenticated target application during the user's active session on the application service (e.g., while the user is logged into the active session).

At 508, the IDP sends MFA requests to the application service (e.g., to the meeting server) to perform MFA that includes one or more biometric tests. The application service performs the biometric test and, at 510, reports to the IDP biometric test results that indicate whether each of the one or more biometric tests passed or failed. The biometric tests results also include a report timestamp (e.g., a second timestamp) that indicates a time when the biometric tests were performed.

Upon receiving the biometric test results, and upon determining that the report timestamp and the request timestamp both fall within a predetermined time period, at 512, the IDP determines whether the (user) authentication into the target application has passed or failed based on the biometric test results. The IDP determines that the authentication has passed when the biometric test results indicate that each biometric test has passed and the user device/target application and application service are all trusted. In an example in which each biometric test result indicates a pass confidence, the IDP determines that the authentication has passed when each pass confidence exceeds a predetermined confidence threshold. When authentication has passed, the IDP sends to the user device/target application, an authentication token.

The IDP determines that the authentication has failed when the biometric test results indicate that the one or more biometric tests have failed, or the user device/target application and application service are not all trusted. In that case, in lieu of the authentication token, the IDP sends to the user device a device request to perform multifactor authentication of the user that is to be satisfied through the user device (not an application service).

In summary, zero-touch user MFA is performed. In an example, if a user is active on a video meeting session, live video and audio streams may be used to authenticate the user via multifactor means such as facial recognition, instead of prompting the user to login via a classic sense (e.g., using username/password and dual-pin entry). This allows for a non-disruptive authentication means, for situations when the user is logging into target applications while on an active video meeting. Other biometrics beyond facial recognition (e.g., voice fingerprinting, acoustic authentication in earbuds, etc.) can also be used for additional validation to improve confidence, or as optional means when video may not be available.

For example, for a user who is actively participating in an authenticated meeting and has video enabled, the embodiments leverage authentication (SSO/IDP) from a meeting server's session plus additional biometrics from the meeting's media streams (such as facial recognition from video, or voice fingerprinting from audio) to offer a hands-free and interruption-free trusted MFA authentication source back to the IDP. With that capability, when that user is logging into an unauthenticated application during the meeting, the embodiments allow for the IDP to receive a real-time validated authentication request and response from the meeting server, and prevent the user from having to re-authenticate via another MFA request. The security strength of authentication is not diluted with the embodiments, because the embodiments confirm that the user is authenticated via multiple means in real-time while they are on the meeting, by time stamping and signing authentication tokens, and by only leveraging trusted devices associated to the authenticating user for the authentication process.

Figure 6:
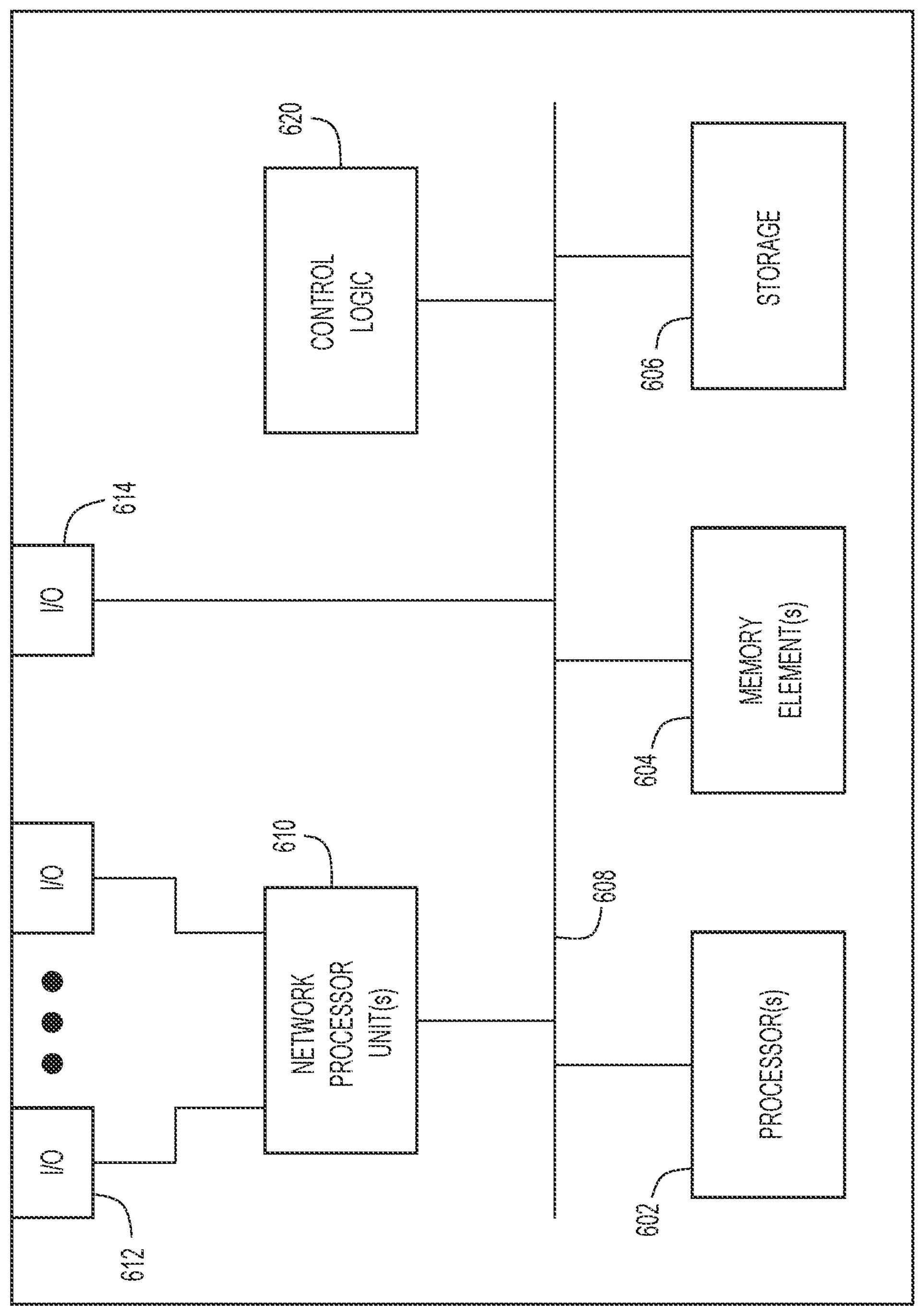
FIG. 6 illustrates a hardware block diagram of a computing device that may perform functions associated with operations performed in the embodiments presented herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5 in order to perform operations of the various techniques discussed herein. For example, computing device may represent or be used to implement any of IDP 108, user device 102, endpoint EP, application services 106, and so on.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processors, baseband signal processors, modems, PHYs, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard (which may be biometric), keypad (which may be biometric), a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element (s) 604 and/or storage 606 being able to store data, software, code, instructions (e.g., processor instructions), logic, parameters, combinations thereof, or the like that are executed to carry out operations (including generating GUIs for display and interacting with the GUIs) in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, domains, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In summary, in some aspects, the techniques described herein relate to a method including: at an identity provider, upon receiving a request for authentication of a user to a target application that is hosted on a user device and into which the user has logged-in: identifying one or more biometric tests to be applied to the user to satisfy the request; selecting, from a list of application services that have trust relationships with the identity provider, an application service which has an active session with the user and supports the one or more biometric tests; requesting the application service to perform multifactor authentication that includes the one or more biometric tests; receiving, from the application service, biometric test results that indicate whether each of the one or more biometric tests passed or failed; and determining that the authentication has passed or failed based on the biometric test results.

In some aspects, the techniques described herein relate to a method, wherein: determining that the authentication has passed or failed includes determining that the authentication has passed when the biometric test results indicate that each biometric test has passed; and the method further includes: when the authentication has passed, sending an authentication token to the user device.

In some aspects, the techniques described herein relate to a method, further including: verifying that the identity provider has a trust relationship with the target application, wherein determining that the authentication has passed further includes determining that the authentication has passed when the application service and the target application have the trust relationship and the trust relationships with the identity provider and each biometric test has passed.

In some aspects, the techniques described herein relate to a method, wherein: determining that the authentication has passed or failed includes determining that the authentication has failed when the biometric test results indicate that the one or more biometric tests have failed; and the method further includes: when the authentication has failed, sending to the user device a device request to perform the multifactor authentication of the user that is to be satisfied through the user device.

In some aspects, the techniques described herein relate to a method, wherein: receiving the request includes receiving the request to include a user identity of the user; and identifying the one or more biometric tests includes searching multifactor authentication user profiles that include mappings of biometric tests to user identities based on the user identity.

In some aspects, the techniques described herein relate to a method, wherein: identifying includes identifying, as the one or more biometric tests, facial recognition that includes capturing video of the user and comparing the video to a faceprint of the user, voice recognition that includes capturing voice of the user and comparing the voice to a voiceprint of the user, or fingerprint recognition that includes capturing a fingerprint reading from the user and comparing the fingerprint reading to a known fingerprint of the user; and requesting includes requesting the application service to perform the facial recognition, the voice recognition, or the fingerprint recognition.

In some aspects, the techniques described herein relate to a method, wherein: the request includes a first timestamp; the biometric test results include a second timestamp; and the method further includes: upon determining that the first timestamp and the second timestamp both fall within a predetermined time period, performing determining that the authentication has passed or failed.

In some aspects, the techniques described herein relate to a method, further including: upon determining that the first timestamp and the second timestamp do not both fall within the predetermined time period, not performing determining that the authentication has passed or failed.

In some aspects, the techniques described herein relate to a method, wherein: the biometric test results further include digital signatures appended by the application service.

In some aspects, the techniques described herein relate to a method, wherein: each biometric test result that indicates that a biometric test has passed further includes a confidence that the biometric test has passed; and determining that the authentication has passed or failed includes determining that the authentication has passed when each confidence exceeds a predetermined confidence threshold.

In some aspects, the techniques described herein relate to a method, further including, by the identity provider: establishing the trust relationships with the application service; and establishing a trust relationship with the target application.

In some aspects, the techniques described herein relate to a method, wherein: the application service includes a collaboration service supported by a meeting server and an endpoint device that operates under control of the meeting server and supports the one or more biometric tests.

In some aspects, the techniques described herein relate to an apparatus including: a network interface to communicate with a network; and a processor of an identity provider, wherein the processor is coupled to the network interface and is configured to perform, upon receiving a request for authentication of a user to a target application that is hosted on a user device and into which the user has logged-in: identifying one or more biometric tests to be applied to the user to satisfy the request; selecting, from a list of application services that have trust relationships with the identity provider, an application service which has an active session with the user and supports the one or more biometric tests; requesting the application service to perform multifactor authentication that includes the one or more biometric tests; receiving, from the application service, biometric test results that indicate whether each of the one or more biometric tests passed or failed; and determining that the authentication has passed or failed based on the biometric test results.

In some aspects, the techniques described herein relate to an apparatus, wherein: the processor is configured to perform determining that the authentication has passed or failed by determining that the authentication has passed when the biometric test results indicate that each biometric test has passed; and the processor is further configured to perform: when the authentication has passed, sending an authentication token to the user device.

In some aspects, the techniques described herein relate to an apparatus, wherein the processor is further configured to perform: verifying that the identity provider has a trust relationship with the target application, wherein the processor is configured to perform determining that the authentication has passed by determining that the authentication has passed when the application service and the target application have the trust relationship and the trust relationships with the identity provider and each biometric test has passed.

In some aspects, the techniques described herein relate to an apparatus, wherein: the processor is configured to perform determining that the authentication has passed or failed includes determining that the authentication has failed when the biometric test results indicate that the one or more biometric tests have failed; and the apparatus further includes: when the authentication has failed, sending to the user device a device request to perform the multifactor authentication of the user that is to be satisfied through the user device.

In some aspects, the techniques described herein relate to an apparatus, wherein: the processor is configured to perform receiving the request by receiving the request to include a user identity of the user; and the processor is configured to perform identifying the one or more biometric tests by searching multifactor authentication user profiles that include mappings of biometric tests to user identities based on the user identity.

In some aspects, the techniques described herein relate to a non-transitory computer readable medium encoded with instructions that, when executed by a processor of an identity provider, cause the processor to perform: upon receiving a request for authentication of a user to a target application that is hosted on a user device and into which the user has logged-in: identifying one or more biometric tests to be applied to the user to satisfy the request; selecting, from a list of application services that have trust relationships with the identity provider, an application service which has an active session with the user and supports the one or more biometric tests; requesting the application service to perform multifactor authentication that includes the one or more biometric tests; receiving, from the application service, biometric test results that indicate whether each of the one or more biometric tests passed or failed; and determining that the authentication has passed or failed based on the biometric test results.

In some aspects, the techniques described herein relate to a non-transitory computer readable medium, wherein: the instructions to cause the processor to perform determining that the authentication has passed or failed include instructions to cause the processor to perform determining that the authentication has passed when the biometric test results indicate that each biometric test has passed; and the instructions further include instructions to cause the processor to perform: when the authentication has passed, sending an authentication token to the user device.

In some aspects, the techniques described herein relate to a non-transitory computer readable medium, further including instructions to cause the processor to perform: verifying that the identity provider has a trust relationship with the target application, wherein the instructions to cause the processor to perform determining that the authentication has passed further include instructions to cause the processor to perform determining that the authentication has passed when the application service and the target application have the trust relationship and the trust relationships with the identity provider and each biometric test has passed.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

at an identity provider, upon receiving a request for authentication of a user to a target application that is hosted on a user device and into which the user has logged-in:

storing a list of application services having trust relationships with the identity provider and that are mapped to biometric sensors provided by each application service;

identifying one or more biometric tests to be applied to the user to satisfy the request;

searching the list of application services based on the one or more biometric tests;

identifying, based on results of searching, an application service which has an active session with the user and supports the one or more biometric tests;

requesting the application service to perform multifactor authentication that includes the one or more biometric tests;

receiving, from the application service, biometric test results that indicate whether each of the one or more biometric tests passed or failed; and determining that the authentication has passed or failed based on the biometric test results.

2. The method of claim 1, wherein:

determining that the authentication has passed or failed includes determining that the authentication has passed when the biometric test results indicate that each biometric test has passed; and the method further comprises: when the authentication has passed, sending an authentication token to the user device.

3. The method of claim 2, further comprising:

verifying that the identity provider has a trust relationship with the target application, wherein determining that the authentication has passed further includes determining that the authentication has passed when the application service and the target application have the trust relationship and the trust relationships with the identity provider and each biometric test has passed.

4. The method of claim 2, wherein:

determining that the authentication has passed or failed includes determining that the authentication has failed when the biometric test results indicate that the one or more biometric tests have failed; and the method further comprises: when the authentication has failed, sending to the user device a device request to perform the multifactor authentication of the user that is to be satisfied through the user device.

5. The method of claim 1, wherein:

receiving the request includes receiving the request to include a user identity of the user; and identifying the one or more biometric tests includes searching multifactor authentication user profiles that include mappings of biometric tests to user identities based on the user identity.

6. The method of claim 1, wherein:

identifying the one or more biometric tests includes identifying, as the one or more biometric tests, facial recognition that includes capturing video of the user and comparing the video to a faceprint of the user, voice recognition that includes capturing voice of the user and comparing the voice to a voiceprint of the user, or fingerprint recognition that includes capturing a fingerprint reading from the user and comparing the fingerprint reading to a known fingerprint of the user; and requesting includes requesting the application service to perform the facial recognition, the voice recognition, or the fingerprint recognition.

7. The method of claim 1, wherein:

the request includes a first timestamp;

the biometric test results include a second timestamp; and the method further comprises: upon determining that the first timestamp and the second timestamp both fall within a predetermined time period, performing determining that the authentication has passed or failed.

8. The method of claim 7, further comprising:

upon determining that the first timestamp and the second timestamp do not both fall within the predetermined time period, not performing determining that the authentication has passed or failed.

9. The method of claim 1, wherein:

the biometric test results further include digital signatures appended by the application service.

10. The method of claim 1, wherein:

each biometric test result that indicates that a biometric test has passed further includes a confidence that the biometric test has passed; and determining that the authentication has passed or failed includes determining that the authentication has passed when each confidence exceeds a predetermined confidence threshold.

11. The method of claim 1, further comprising, by the identity provider:

establishing the trust relationships with the application service; and establishing a trust relationship with the target application.

12. The method of claim 1, wherein:

the application service includes a collaboration service supported by a meeting server and an endpoint device that operates under control of the meeting server and supports the one or more biometric tests.

13. An apparatus comprising:

a network interface to communicate with a network; and a processor of an identity provider, wherein the processor is coupled to the network interface and is configured to perform, upon receiving a request for authentication of a user to a target application that is hosted on a user device and into which the user has logged-in:

storing a list of application services having trust relationships with the identity provider and that are mapped to biometric sensors provided by each application service;

identifying one or more biometric tests to be applied to the user to satisfy the request;

searching the list of application services based on the one or more biometric tests;

identifying, based on results of searching, an application service which has an active session with the user and supports the one or more biometric tests;

requesting the application service to perform multifactor authentication that includes the one or more biometric tests;

receiving, from the application service, biometric test results that indicate whether each of the one or more biometric tests passed or failed; and determining that the authentication has passed or failed based on the biometric test results.

14. The apparatus of claim 13, wherein:

the processor is configured to perform determining that the authentication has passed or failed by determining that the authentication has passed when the biometric test results indicate that each biometric test has passed; and the processor is further configured to perform: when the authentication has passed, sending an authentication token to the user device.

15. The apparatus of claim 14, wherein the processor is further configured to perform:

verifying that the identity provider has a trust relationship with the target application, wherein the processor is configured to perform determining that the authentication has passed by determining that the authentication has passed when the application service and the target application have the trust relationship and the trust relationships with the identity provider and each biometric test has passed.

16. The apparatus of claim 14, wherein:

the processor is configured to perform determining that the authentication has passed or failed by determining that the authentication has failed when the biometric test results indicate that the one or more biometric tests have failed; and the apparatus further comprises: when the authentication has failed, sending to the user device a device request to perform the multifactor authentication of the user that is to be satisfied through the user device.

17. The apparatus of claim 13, wherein:

the processor is configured to perform receiving the request by receiving the request to include a user identity of the user; and the processor is configured to perform identifying the one or more biometric tests by searching multifactor authentication user profiles that include mappings of biometric tests to user identities based on the user identity.

18. A non-transitory computer readable medium encoded with instructions that, when executed by a processor of an identity provider, cause the processor to perform:

upon receiving a request for authentication of a user to a target application that is hosted on a user device and into which the user has logged-in:

storing a list of application services having trust relationships with the identity provider and that are mapped to biometric sensors provided by each application service;

identifying one or more biometric tests to be applied to the user to satisfy the request;

searching the list of application services based on the one or more biometric tests;

identifying, based on results of searching, an application service which has an active session with the user and supports the one or more biometric tests;

requesting the application service to perform multifactor authentication that includes the one or more biometric tests;

receiving, from the application service, biometric test results that indicate whether each of the one or more biometric tests passed or failed; and determining that the authentication has passed or failed based on the biometric test results.

19. The non-transitory computer readable medium of claim 18, wherein:

the instructions to cause the processor to perform determining that the authentication has passed or failed include instructions to cause the processor to perform determining that the authentication has passed when the biometric test results indicate that each biometric test has passed; and the instructions further comprise instructions to cause the processor to perform: when the authentication has passed, sending an authentication token to the user device.

20. The non-transitory computer readable medium of claim 19, further comprising instructions to cause the processor to perform:

verifying that the identity provider has a trust relationship with the target application, wherein the instructions to cause the processor to perform determining that the authentication has passed further include instructions to cause the processor to perform determining that the authentication has passed when the application service and the target application have the trust relationship and the trust relationships with the identity provider and each biometric test has passed.

* * * * *